(12) United States Patent
Cartabbia

(10) Patent No.: US 9,758,928 B2
(45) Date of Patent: Sep. 12, 2017

(54) SIMPLIFIED METHOD FOR MAKING AN IMPERMEABLE JOINING ON THREE-LAYER OR BI-LAYER FABRIC MATERIALS, EITHER WITH OR WITHOUT A COMPLEX CONSTRUCTION ON A JOINING SIDE THEREOF AND BEING PRELIMINARILY JOINED BY A STITCHING OR ULTRASOUND JOINING ARRANGEMENT

(75) Inventor: Giovanni Cartabbia, Palazzolo Sull'Oglio (IT)

(73) Assignee: MACPI S.P.A. PRESSING DIVISION, Palazzolo Sull'Oglio (BS) (IT)

( * ) Notice: Subject to any disclaimer, the term of this patent is extended or adjusted under 35 U.S.C. 154(b) by 283 days.

(21) Appl. No.: 13/373,812

(22) Filed: Dec. 1, 2011

(65) Prior Publication Data

US 2012/0186720 A1    Jul. 26, 2012

(30) Foreign Application Priority Data

Jan. 24, 2011    (IT) ................ MI2011A0065

(51) Int. Cl.
*B29C 65/08* (2006.01)
*B29C 65/72* (2006.01)
(Continued)

(52) U.S. Cl.
CPC .......... *D06M 17/00* (2013.01); *A41D 27/245* (2013.01); *B29C 65/08* (2013.01); *B29C 65/505* (2013.01); *B29C 65/62* (2013.01); *B29C 65/72* (2013.01); *B29C 66/0246* (2013.01); *B29C 66/0384* (2013.01); *B29C 66/112* (2013.01); *B29C 66/1142* (2013.01); *B29C 66/135* (2013.01); *B29C 66/43* (2013.01); *B29C 66/7292* (2013.01); *B29C 66/73187* (2013.01); *B29C 66/919* (2013.01); *B29C 66/9141* (2013.01); *D06H 5/00* (2013.01); *D06M 23/18* (2013.01); *A41D 2400/22* (2013.01); *B29C 65/4815* (2013.01); *B29C 66/0242* (2013.01); *B29C 66/21* (2013.01); *B29C 66/72941* (2013.01); *B29C 66/929* (2013.01)

(58) Field of Classification Search
CPC ... B29C 66/322; B29C 66/0384; B29C 65/10; B29C 65/505
USPC .............. 156/73.4; 2/275, 2.15, 69, 93
See application file for complete search history.

(56) References Cited

U.S. PATENT DOCUMENTS 3,532,014 A * 10/1970 Franz ................ 83/53
3,729,784 A * 5/1973 Mazzone ........... D06C 23/00
                                                    26/2 R
(Continued)

*Primary Examiner* — Matthew Daniels
*Assistant Examiner* — Marta Dulko
(74) *Attorney, Agent, or Firm* — Hedman & Costigan, P.C.; James V. Costigan; Kathleen A. Costigan

(57) ABSTRACT

A simplified method for making an impermeable joining on three-layer or bi-layer fabric materials, either with or without a complex construction on a joining side thereof, and being preliminarily joined by a stitching or ultrasound joining arrangement, wherein the method comprises only two method steps, a first joining step of joining two fabric material panels and a second impermeabilizing step carried out by cauterizing and sealing a strip element, and being performed by a single machine in a single operation thereof.

2 Claims, 3 Drawing Sheets

(51) Int. Cl.
*D06M 17/00* (2006.01)
*A41D 27/24* (2006.01)
*B29C 65/50* (2006.01)
*B29C 65/62* (2006.01)
*D06H 5/00* (2006.01)
*D06M 23/18* (2006.01)
*B29C 65/00* (2006.01)
*B29C 65/48* (2006.01)

(56) References Cited

U.S. PATENT DOCUMENTS

| | | | | |
|---|---|---|---|---|
| 5,202,077 | A * | 4/1993 | Marco | B26D 7/08 139/291 C |
| 6,236,030 | B1 * | 5/2001 | Neumann | 219/628 |
| 6,770,240 | B1 * | 8/2004 | Laird | D06C 23/04 26/2 R |
| 7,434,272 | B2 * | 10/2008 | Hannon | A41D 15/005 112/418 |
| 7,490,651 | B2 * | 2/2009 | Cartabbia | A41D 27/245 156/358 |
| 2006/0000546 | A1 * | 1/2006 | Liao | B29C 66/7292 156/285 |
| 2008/0196136 | A1 * | 8/2008 | Fellouhe | A41D 27/245 2/69 |
| 2009/0199970 | A1 * | 8/2009 | Cartabbia | B29C 65/10 156/497 |
| 2009/0305608 | A1 * | 12/2009 | Bonnin | A41C 3/12 450/39 |
| 2010/0215889 | A1 * | 8/2010 | Cienski | A41D 27/24 428/57 |
| 2012/0328824 | A1 * | 12/2012 | Cartabbia | A41D 27/245 428/104 |

* cited by examiner

SIMPLIFIED METHOD FOR MAKING AN IMPERMEABLE JOINING ON THREE-LAYER OR BI-LAYER FABRIC MATERIALS, EITHER WITH OR WITHOUT A COMPLEX CONSTRUCTION ON A JOINING SIDE THEREOF AND BEING PRELIMINARILY JOINED BY A STITCHING OR ULTRASOUND JOINING ARRANGEMENT

BACKGROUND OF THE INVENTION

The present invention relates to a simplified method for making an impermeable joining on three-layer or bi-layer fabric materials, either with or without a complex construction on a joining side thereof and being preliminarily joined by a stitching or ultrasound joining arrangement.

Composite textile articles, made by coating or laminating textile materials with barrier membrane layers, to provide liquid impermeable fabric materials are already known.

The above articles or products are called "laminated" articles and are conventionally used for making protective garments or other liquid proof or impermeable products and articles.

The laminated fabrics are constituted by two or more laminated fabric layers, at least one of which is a barrier-membrane.

A most common three-layer laminated arrangement comprises an outer fabric material, a barrier-membrane and a complex textile construction, such as a fleece-pile construction, constituting the inner layer.

The outer fabric material is a textile layer of different types which may either comprise or not a complex textile material.

The barrier-membrane consists of a synthetic material film which is transpirable for liquids in a direction, from inside to outside, while being impermeable to liquids in the opposite direction.

By the term "complex textile construction" (that is the inner layer) a variously processed (shaped, engraved, raised fabric material) textile article or a fibrous or filamentary construction is meant which may comprise either woven or non-woven textile, brushed, raised, carded and the like materials.

Laminated fabric materials are at present used for making garments, coatings or linings and other liquid transpiring and impermeable articles or products.

The above products are also conventionally called "soft shell" articles, since they may comprise flexible and soft junctions, a long duration complex textile material on the outside thereof and a soft textile material on the inside thereof to provide good wearing and comfort properties.

The above mentioned prior articles are made by very complex making methods providing to remove large textile material amounts and use additional sealing strips.

Laminated textile products or articles are also known which are impermeable to liquids on their outside but transpiring from their inside to their outside.

In the garment industry, no reliable, efficient and inexpensive method is at present available for joining two or more laminated textile material panels or pieces to provide a complex textile construction including a joined or seamed or stitched portion having permanent impermeableness characteristics, together with a satisfactory flexibility and softness.

In fact, in making impermeable junctions on two, three or multiple layer laminated fabric materials having a very complex textile construction inner layer, a lot of difficulties have been encountered, which are caused by different reasons.

At first, liquids may enter the textile materials through the so-called "wick" or capillarity effect.

Moreover, it is not possible to prevent liquids from entering the textile materials by applying on the outside of said materials adhesive sealing substances, such as fluid sealing substances, since it would be necessary to perform a full impregnating only of the sealing region, which operation, besides being difficult, would cause an unacceptable stiffening of the fabric joining part being processed.

In fact, the individual threads or yarns forming the textile layer comprise a plurality of filaments defining gaps therebetween which cannot be easily sealed by conventional sealing methods, thereby liquids are easily absorbed because of the above mentioned wick or capillarity effect.

Moreover, prior sealing methods disadvantageously comprise three different operating steps, that is a preparing of the textile or fabric material, a joining of the prepared fabric materials and a sealing of the joining region.

In said fabric material preparing step, and because of the above disclosed passage of liquids through the textile fibers, it is necessary to remove the inner layer of the complex textile material at the sealing area to arrive at the protective barrier layer surface which constitutes the textile material impermeable part.

This preparing step is per se a shaving or scarifying step which must be carried out on different machines and by different methods such as shaving, scarifying and sandblasting apparatus and processes.

In the above joining step, after preparing the fabric panels on pieces as above disclosed, said panels or pieces are joined by different joining methods, such as seaming, ultrasound and high frequency methods, while leaving, at the joining sides, an impermeable protective barrier portion exposed to the view.

After joining the fabric panels, it is moreover necessary to seal the joining regions, which operation is performed by sealing taping machines which hot apply an adhesive impermeable tape or strip on the protective barrier portions left free on the sides of the joining regions.

Thus, the joining regions are finally sealed and will have the desired impermeable properties.

This sealing is achieved by causing the adhesive tape or strip to adhere to a preliminarily uncovered impermeable portion of the protective barrier.

Thus, the above mentioned prior methods comprise three main operating steps, that is a preparing, a joining and a sealing steps, each of which must be carried out either in a single or in multiple operations.

The shaving operation, in particular, is a very delicate and difficult one since, during this step, the barrier membrane may be easily damaged or textile fiber portions may be left unprocessed.

In some cases, the fabric material characteristics, such as a poor adhesion between the outer fabric material and the underlying barrier membrane, or a heavy use of the garment article, requires to preliminarily mechanically connect or join the fabric panels, which operation is performed either by seaming or ultrasounds, since merely welded or sealed joins cannot provide sufficient sealing properties, the joining region being then, as stated, made impermeable by taping.

Thus, in actual practice, prior impermeable joining methods require four operating steps: a mechanical scarifying of the fabric pile on the inner side of the first panel; a further mechanical scarifying of the second fabric panel; a joining of the two scarified fabric panels by sealing or ultrasound joining operations, and an application of an impermeable tape or strip on the joining line.

As mentioned, said two mechanical scarifying operations are very difficult to perform and require a long operating time.

SUMMARY OF THE INVENTION

Accordingly, the aim of the present invention is to provide a simplified method for making an impermeable joining on three-layer or bi-layer fabric materials, either with or without a complex construction on a joining side thereof and being preliminarily joined by a stitching or ultrasound joining arrangement.

Within the scope of the above mentioned aim, a main object of the invention is to provide such a joining method which does not include the above mentioned preparing and mechanical scarifying operations, and in which the joining may be achieved by two joining operations only, instead of the four joining operations at present necessary.

Another object of the present invention is to provide such a method allowing to make either protecting or non protective garment articles, related shoes and technical and furnishing equipments, and which may be carried out in an inexpensive and safe manner, and in which the made articles are aesthetically pleasant, and have very good impermeable features and a very small thickness.

Yet another object of the present invention is to provide such a method which, owing to its specifically designed operating steps, is very reliable and safe in operation.

According to one aspect of the present invention, the above mentioned aim and objects, as well as further objects which will become more apparent hereinafter, are achieved by a simplified method for making an impermeable joining on three-layer or bi-layer fabric materials, either with or without a complex construction on a joining side thereof, and being preliminarily joined by a stitching or ultrasound joining arrangement, characterized in that said method comprises only two method steps, a first joining step of joining two fabric material panels, and a second impermeabilizing step carried out by cauterizing and sealing a strip element, and being performed by a single machine in a single operation thereof.

The first operating step is carried out by a stitched or seamed joining, or by spot sealing operation, carried out by an ultrasound machine, on two bi-/three-layer fabric panels, in a natural condition thereof, without removing pile material on the inner fabric layer.

The second operating step consists of cauterizing (that is burning), by overheated air, the inner portion of the fabric panel, for example the pile thereof, at the joining line and on the sides adjacent said joining line, thereby modifying the pile construction, using a same and single machine, and applying a seal, immediately after said cauterizing operation, an impermeable adhesive strip on the cauterized portion.

BRIEF DESCRIPTION OF THE DRAWINGS

Further characteristics and advantages of the present invention will become more apparent from the following detailed disclosure of a preferred, though not exclusive, embodiment of the invention, which is illustrated, by way of an indicative but not limitative example, in the accompanying drawings, where.

DESCRIPTION OF THE PREFERRED EMBODIMENTS

With reference to the number references of the above mentioned figures, the simplified method for making an impermeable joining on three-layer or bi-layer fabric materials, either with or without a complex construction on a joining side thereof, and being preliminarily joined by a stitching or ultrasound joining arrangement, comprises only two operating steps: a first operating step for joining the two fabric or textile panels or pieces, generally indicated by the reference numbers 11 and 12, by a stitching or a ultrasound joining, and a second impermeabilizing joining operation consisting of a cauterizing and seaming step being performed by a single machine in a single processing operation.

The reference number 1 shows the outer fabric material, 2 the protective barrier, 3 the composite inner fabric material of a first constant thickness, for example a pile fabric material of a second constant thickness, and the reference number 4 shows the impermeable adhesive strip or tape.

Figure 1:
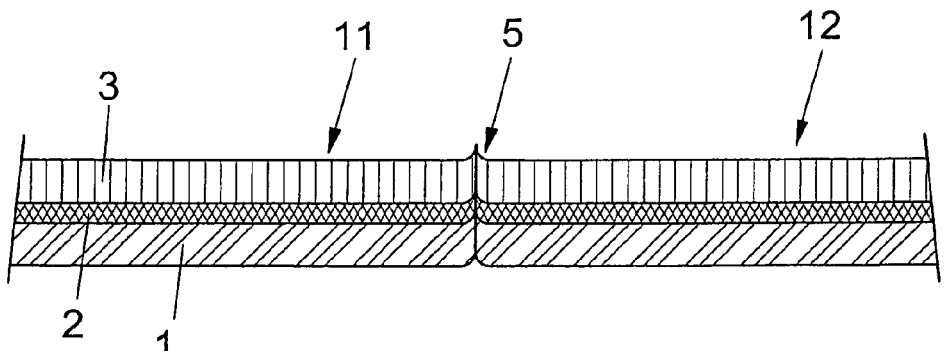
FIGS. 1, 2 and 3 are cross-section views showing an operating sequence of an operating step for forming an impermeable joint on three-layer fabric materials, being joined by ultrasounds.
Figure 2:
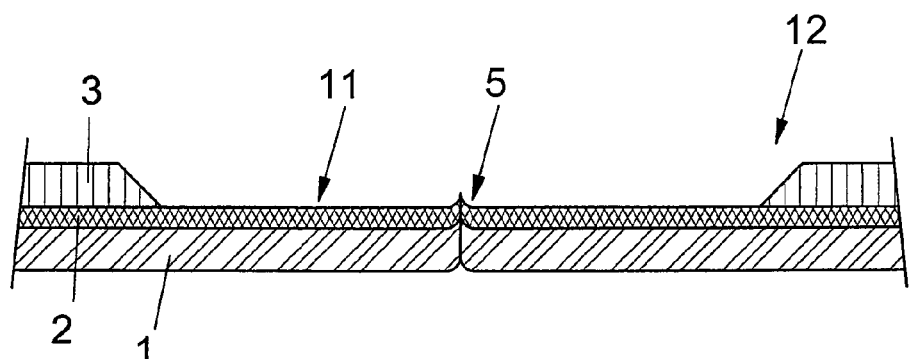
Figure 3:
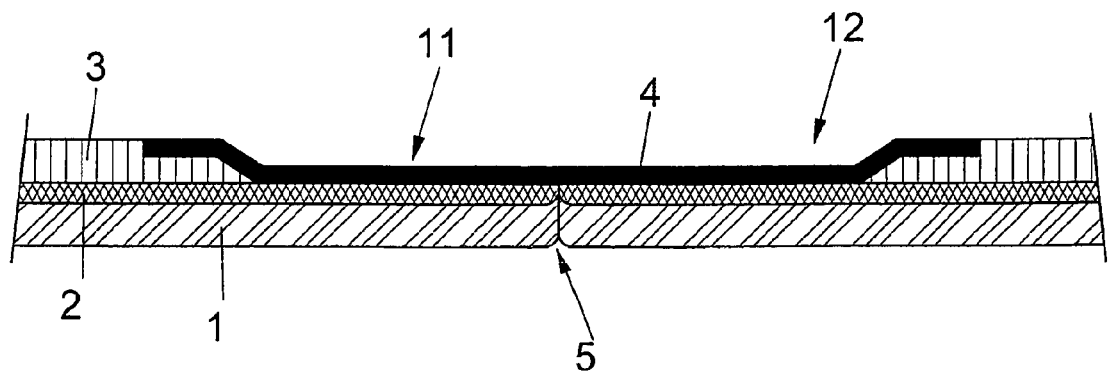

FIGS. 1, 2 and 3 show the joining of the fabric panels 11 and 12 by a ultrasound welding operation 5.

Figure 4:
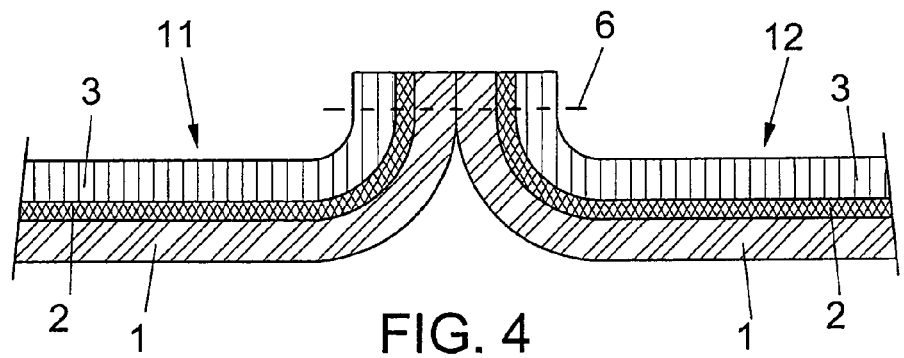
FIGS. 4, 5 and 6 are further cross-section views showing an operating sequence for forming an impermeable joint on three-layer fabric materials, which are joined by a simple stitching or seaming operation.
Figure 5:
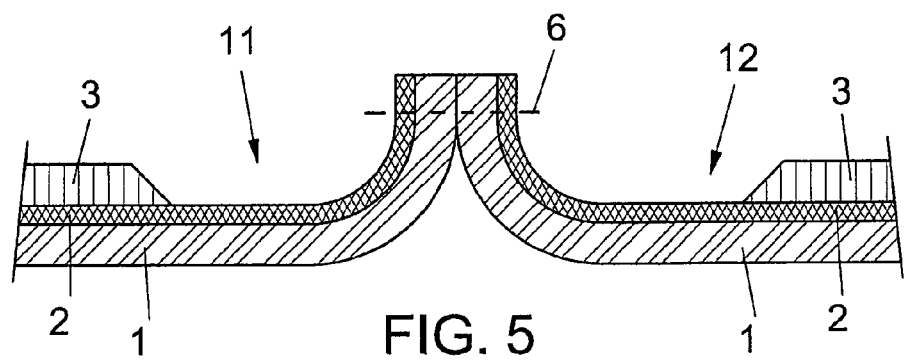
Figure 6:
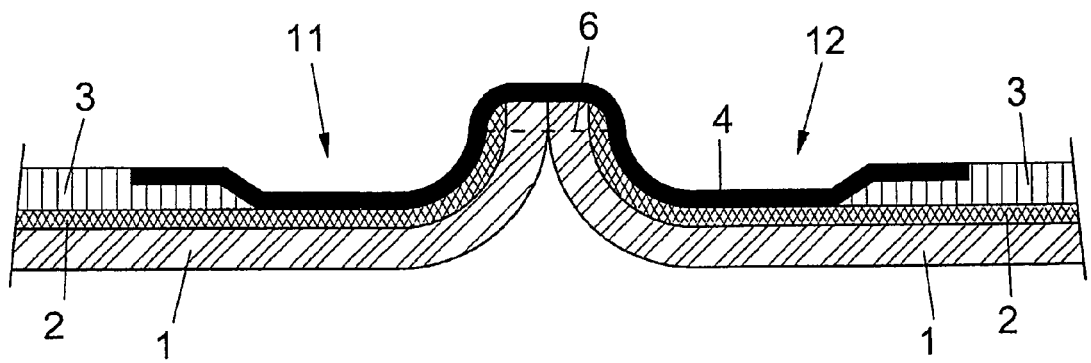

FIGS. 4, 5 and 6 show the joining of the fabric panels 11 and 12 by a simple stitching, generally indicated by the reference number 6.

Figure 7:
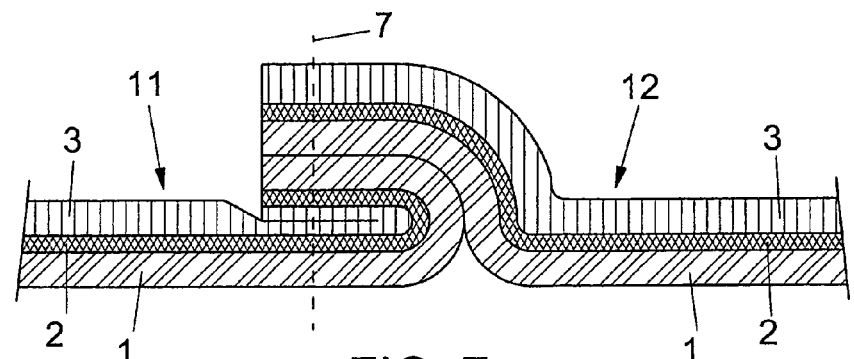
FIGS. 7, 8 and 9 are further cross-section views showing an operating sequence for forming an impermeable joint on three-layer fabric materials, which are joined to one another by a folded seam.
Figure 8:
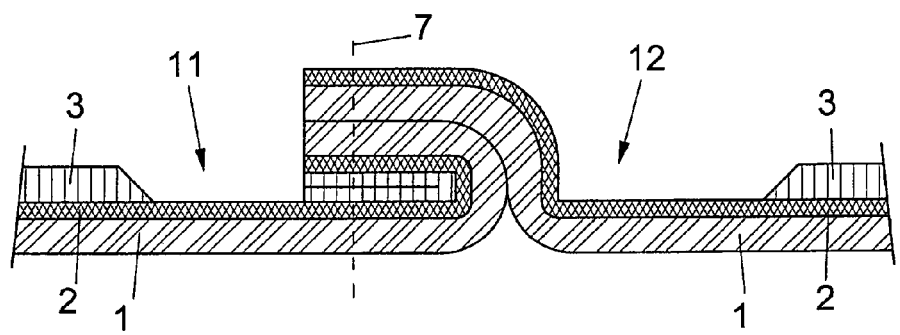
Figure 9:
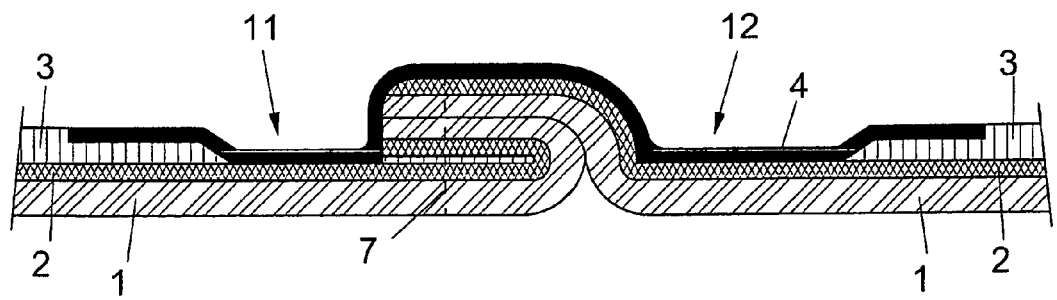

FIGS. 7, 8 and 9 show the joining of the fabric panels 11 and 12 by a folded stitching or seaming, generally indicated by the reference number 7.

According to the present invention, the first joining operation, schematically illustrated in FIGS. 1, 4 and 7, is carried out starting from two bi-/three-layer fabric panels, in a natural condition thereof, by either a simple 6 or complex 7 stitching, or by a spot sealing operation 5, carried out on an ultrasound seaming machine.

The second operating step is in turn carried out by using a single specifically designed machine performing a cauterizing operation, schematically shown in FIGS. 2, 5 and 8.

Said cauterizing operation or step is carried out by blowing overheated air on an inner portion 3 of the fabric panels, for example in a pile fabric arrangement, at the joining line and on sides adjoining said line so as to burn the textile structure of the affected fabric surface.

In this connection, it should be pointed out that said cauterizing step is a localized burning carried out by one or more of overheated air jets at a temperature preferably varying from 200° C. to 350° C. and at a pressure preferably varying from 1.5 to 2.5 bars.

This hot burning processing method may be carried out on complex bi- or three-layer laminated fabric materials, of a pile, fleece, raised, brushed, non-woven type, or on a fabric material layer having either a smooth or a structured or textured surface.

In the first case, the cauterizing step will fully burn the structure of the surface fabric fibers since they are brought to a plasticized status, and are flattened and partially removed.

In the second case, the surface fabic piles are eliminated thereby the fabic material will be smooth and compact.

In this operating step, the overheated air jet is directed only on the involved joining region by using the air jet temperature, flow rate and pressure necessary to cauterize or burn the surface being processed.

The cauterizing step allows to modify and compact the involved textile material layer, thereby making it suitable for the following welding/sealing operation, since the thus achieved surface would prevent any liquids from passing therethrough, and moreover the adhesive will affect not single filaments having a poor mechanical strength, but the overall compacted surface thereby providing a good mechanical strength against tearing.

Moreover, the cauterizing allows the fabric joining region thickness to be greatly reduced, which is very advantageous as raised pile fabric materials are processed.

After the cauterizing operation, and on the same cauterizing machine, that is a machine obviously including cauterizing means and sealing means and an adhesive impermeable strip or tape 4 is immediately welded or sealed on the cauterized portion, which adhesive strip may comprise an adhesive film with different characteristics, compositions and thicknesses, to be easily fitted to different fabric materials and technical and marketing requirements, said adhesive strip comprising, for example, colored, light reflecting, customized films and so on.

It has been found that the invention fully achieves the intended aim and objects.

In fact, the invention has provided a method for making an impermeable joining on three-layer or bi-layer fabric materials which is much more simple than prior methods and comprises only two main operating steps, that is a joining of the fabric panels and cauterizing/taping of the made joining.

In particular, the present invention allows to perform, in a quick and inexpensive manner, an impermeable joining on bi- or three-layer laminated fabric materials having a complex textile structure on the joining side thereof.

In practicing the invention, the used materials, as well as the contingent size and shapes, can be any, depending on requirements.

The invention claimed is:

1. A method for making an impermeable joining on two fabric material panels on a joining side thereof, wherein said fabric material panels comprise each at least a fabric material layer of a constant thickness with surface fabric material fibers and wherein said method consists of performing two method steps comprising:
    (a) performing a first joining step of joining said two fabric material panels by stitching or ultrasound joining to provide a joining line of said panels; and
    (b) performing a second step after said first joining step has been performed, the second step comprising:
    blowing overheated air jets on said inner portion of said fabric material panels at said joining line and on portions of said fabric material panels adjacent to said joining line, said overheated air jets being ejected with a temperature from 200° C. to 350° C. and a pressure from 1.5 to 2.5 bars to thermally modify textile structure of the portions of said fabric material panels adjacent to said joining line by bringing said surface fibers to a plasticized, flattened and partially removed status; and
    applying and heat welding a sealing adhesive impermeable strip on a thermally modified inner portion of said fabric material panels after the blowing and without application of additional heating.

2. A method according to claim 1, wherein said fabric material layer of a constant thickness comprises surface piles and wherein said second impermeabilizing step partially removes said surface piles to transform said fabric material layer of a constant thickness into a smooth and compact fabric material layer.

* * * * *